US006986386B2

(12) United States Patent
Sekhar et al.

(10) Patent No.: US 6,986,386 B2
(45) Date of Patent: Jan. 17, 2006

(54) SINGLE-COIL TWIN-FAN VARIABLE-AIR-VOLUME (VAV) SYSTEM FOR ENERGY-EFFICIENT CONDITIONING OF INDEPENDENT FRESH AND RETURN AIR STREAMS

(75) Inventors: Chandra Sekhar, Singapore (SG); Kwok Wai Tham, Singapore (SG); David Kok Wai Cheong, Singapore (SG); Nyuk Hien Wong, Singapore (SG)

(73) Assignee: National University of Singapore, Singapore (SG)

( * ) Notice: Subject to any disclaimer, the term of this patent is extended or adjusted under 35 U.S.C. 154(b) by 189 days.

(21) Appl. No.: 10/306,733

(22) Filed: Nov. 29, 2002

(65) Prior Publication Data
US 2003/0150593 A1  Aug. 14, 2003

Related U.S. Application Data

(60) Provisional application No. 60/334,062, filed on Nov. 30, 2001.

(51) Int. Cl.
*F24F 3/052* (2006.01)
(52) U.S. Cl. ...................... 165/214; 165/252
(58) Field of Classification Search ............... 165/213, 165/214, 252, 248; 454/229, 233, 2, 236
See application file for complete search history.

(56) References Cited

U.S. PATENT DOCUMENTS 3,810,327 A * 5/1974 Giansante ................ 165/248

| 3,915,376 A | * | 10/1975 | Attridge et al. | ............. 165/248 |
|---|---|---|---|---|
| 4,210,278 A | * | 7/1980 | Obler | ........................ 236/49.3 |
| 4,283,007 A | * | 8/1981 | Bramow et al. | ............ 165/222 |
| 4,467,706 A | * | 8/1984 | Batcheller et al. | .......... 165/244 |
| 4,663,725 A | * | 5/1987 | Truckenbrod et al. | ...... 165/255 |
| 4,841,733 A | * | 6/1989 | Dussault et al. | ............ 165/223 |
| 4,876,858 A | * | 10/1989 | Shaw et al. | ..................... 62/93 |
| 5,058,388 A | | 10/1991 | Shaw et al. | |
| 5,080,282 A | * | 1/1992 | Harmon | ...................... 454/229 |
| 5,259,553 A | * | 11/1993 | Shyu | ......................... 165/248 |
| 5,461,877 A | | 10/1995 | Shaw et al. | |
| 6,076,739 A | * | 6/2000 | Littleford et al. | ........... 165/222 |
| 6,398,118 B1 | * | 6/2002 | Rosen et al. | ................ 165/248 |
| 6,604,688 B2 | * | 8/2003 | Ganesh et al. | ............. 165/249 |
| 2003/0042012 A1 | * | 3/2003 | Pearson | ..................... 165/210 |

FOREIGN PATENT DOCUMENTS

| DE | 3815730 | * | 11/1988 |
| JP | 60-155840 | * | 8/1985 |
| JP | 63-80149 | * | 4/1988 |

* cited by examiner

*Primary Examiner*—Teresa J. Walberg (57) ABSTRACT

An HVAC system has two variable-air-volume (VAV) systems, a first VAV system for moving fresh air and a second VAV system for moving recycled air. Both the fresh air and recycled air are cooled and dehumidified by a single heat-exchanging coil. The fresh and recycled air streams travel independently in separate ducts until the air streams reach a remotely located mixing box where the air streams mix and ventilate into a room or zone of a building. The HVAC system uses carbon dioxide and temperature sensors in order to regulate the flow of fresh and recycled air to various mixing boxes throughout the building.

22 Claims, 4 Drawing Sheets

SINGLE-COIL TWIN-FAN VARIABLE-AIR-VOLUME (VAV) SYSTEM FOR ENERGY-EFFICIENT CONDITIONING OF INDEPENDENT FRESH AND RETURN AIR STREAMS

CROSS-REFERENCE TO RELATED APPLICATION

The following application claims the benefit of U.S. Provisional Patent Application, Ser. No. 60/334,062 which was filed, Nov. 30, 2001, entitled, SINGLE COIL TWIN VARIABLE AIR VOLUME (VAV) SYSTEM FOR ENERGY EFFICIENT CONDITIONING OF INDEPENDENT FRESH AND RETURN AIR STREAMS and which has the same inventors.

FIELD OF THE INVENTION

This invention relates to heating, ventilation and air conditioning (HVAC) and, more particularly, to energy-efficient cooling and ventilation systems.

BACKGROUND OF THE INVENTION

Air-conditioning, especially in tropical climates, is dictated by the stringent requirements of cooling and dehumidification. The HVAC engineer must seek an optimal design, balancing energy consumption and cost, thermal comfort, and indoor air quality (IAQ), the latter criterion being a function of how well the building is ventilated. Although health and thermal comfort issues can be usually addressed by attempting to eliminate the various sources of indoor pollutants, it is almost impossible to totally eliminate them. It is thus inevitable that ventilation with fresh air should play an important role in the eventual quality of the air in the indoor environment. The high energy-penalty of cooling and dehumidification associated with ventilation in the tropical context is apparent from the large enthalpy difference that exists between the outside air and the indoor air conditions.

Inadequate ventilation almost invariably leads to a deterioration of the indoor air quality due to a build-up of indoor pollutants such as carbon dioxide. Adequate ventilation with poor dehumidifying performance of the cooling coil would be even worse as it is likely to result in elevated humidity levels in the air distribution systems and the occupied zones. This phenomenon could be considered in the context of humidity as an "indoor" pollutant, which propagates the origin and sustenance of microbial contamination. The issue of high indoor humidity levels in tropical buildings originates from the high ambient humidity levels in the ventilation air (fresh air) and the need to provide adequate ventilation to avoid "Sick Building Syndrome".

The basic requirements of any air-conditioning system are to provide comfortable temperature and humidity conditions for the occupants of a building. In a steady-state environment, this is a relatively simple task. However, in a dynamic indoor environment, where cooling and dehumidifying requirements fluctuate with changes in weather and occupancy, designing an energy-efficient air-conditioning is anything but a simple task. Optimizing the design of an air-conditioning system is an even more arduous task in hot and humid climates, where the fresh air contains extremely high humidity levels at all times of the year.

In typical cooling and dehumidifying coil designs, an air stream having an intake temperature and humidity flows over the tubes and fins of a coil while chilled water flows through the tubes of the coil. The chilled water enters the coil at a supply temperature and leaves at a return temperature. The psychrometric performance of the cooling coil determines the cooling and dehumidifying of the air flowing past the coil. In the event of two different air streams being conditioned, two separate coils would typically be employed with either a parallel or a sequential feed of chilled water.

DESCRIPTION OF THE PRIOR ART

Efforts have been directed in the past to achieve energy-efficient dehumidifying performance by addressing the air velocity across the coil, the chilled water velocity through the tubes of the coil and various configurations of the physical geometry of the coil. These designs are exemplified by, for instance, the following patents: U.S. Pat. No. 4,876,858 (Shaw), EP00415747A2 (Shaw), U.S. Pat. No. 5,461,877 (Luminis), KR09302466B1 (Luminis) and WO09220973A1 (Luminis). Some recent enhancements are aimed at collecting the water from the first coil in a manifold and then feeding this water (at the temperature of the chilled water return of the first coil) in a sequential mode to the tubes of the second coil. In essence, this still amounts to two different heat-exchanging coils both on the air side as well as the chilled water side.

However, certain drawbacks are evident from this two-coil design. The primary drawback is that two-coil systems are not very energy-efficient. Secondly, two-coil systems are costly to build, as they require more components. Thirdly, twin-coil systems occupy more space in a building, thus diminishing the usable floor space in building layouts.

Thus, there is a need in the art for an improved ventilation and air conditioning system that overcomes the foregoing deficiencies.

SUMMARY OF THE INVENTION

It is thus an object of the present invention to provide a single-coil twin-fan HVAC system for energy-efficient conditioning of independent fresh and recycled air streams.

As embodied and broadly described herein, the present invention provides a ventilation and air-conditioning system for energy-efficient conditioning of independent fresh and recycled air streams, said system comprising a first intake for drawing in a volume of fresh air; a second intake for drawing in a volume of recycled air; a single-coil heat exchanger for conditioning both the volume of fresh air and the volume of recycled air, thereby producing a supply of conditioned fresh air and a supply of conditioned recycled air; a first fan for moving said supply of conditioned fresh air downstream in a first duct; a second fan for moving said supply of conditioned recycled air downstream in a second duct; a mixing box connected downstream to said first duct and said second duct, said mixing box being an enclosure in which said supply of conditioned fresh air and said supply of conditioned recycled air may mix prior to being ventilated into a room or zone; and a control system for sensing a zonal temperature and a zonal ventilation requirement and for regulating said supply of conditioned fresh air in accordance with said zonal ventilation requirement and for regulating said supply of conditioned recycled air in accordance with said zonal temperature.

With such a system, the advantages are remarkable. A single coil enables the simultaneous conditioning of two separate air streams without mixing in the downstream section of the coil. By treating the fresh and return air streams separately (using separate fans which are independently and separately controlled), the system achieves optimal dehumidifying performance on the fresh air stream (which is predominantly latent cooling in the tropics) and optimal sensible cooling performance on the recycled air stream (which is predominantly sensible cooling). Another key advantage is the ability to achieve the desired cooling and dehumidifying performance in a rather independent manner using a single coil, both on the air and the chilled water sides. A single coil can be installed in a single air-handling unit (AHU) with suitable modifications, which essentially involves installing a thermally insulated sheet-metal barrier to distinctly separate the fresh and the return air streams. By using a single coil with a single chilled water feed, there is no longer any need for intermediate return and supply manifolds between the first (fresh air) and the second (return air) coils. Consequently, the single-coil twin-fan system not only occupies less floor area but it also costs less to build, install and operate.

In other words, the present invention is a single-coil twin-fan system for cooling and dehumidifying two separate air streams. Preferably, the fresh and return air streams are moved by variable-air-volume systems (one for each air stream). The fresh air and recycled air travel in separate ducts but through a single, common coil that cools and dehumidifies both air streams. The fresh air stream and the recycled air stream do not mix when the two streams flow through the coil. The fresh air and recycled air only mix downstream at a mixing box just prior to being ventilated into the room or zone to be cooled. The present invention diminishes humidity levels in the occupied zones of a building in direct response to occupant density. It is to be emphasized that occupant density alone governs the dehumidifying performance of the system in a distinct manner and all other thermal loads govern the cooling performance of the system separately.

This new air conditioning system is capable of distributing two streams of air (one stream of conditioned fresh air and the other stream of conditioned recycled air) to various mixing boxes located throughout a building. By feedback signals, the present invention optimizes energy-efficiency by tailoring the ventilation and cooling requirements in various zones of a building. This system thus provides enhanced indoor air quality (IAQ) with improved energy efficiency.

The significant advantage of this invention over existing state-of-the-art cooling and dehumidifying coils is the relative ease of operation of the coil, which uses a single feed of coolant (e.g. chilled water). The dynamic psychrometric performance of the coil is achieved by modulating the rate of coolant flow as a function of changing cooling and ventilation requirements.

Other objects and features of the invention will become apparent by reference to the following description and the drawings.

BRIEF DESCRIPTION OF THE DRAWINGS

The invention is further described, by way of example only, with reference to the accompanying drawings wherein.

In the drawings, preferred embodiments of the invention are illustrated by way of examples. It is to be expressly understood that the description and drawings are only for the purpose of illustration and are an aid for understanding. They are not intended to be a definition of the limits of the invention.

DESCRIPTION OF THE PREFERRED EMBODIMENTS

Figure 1:
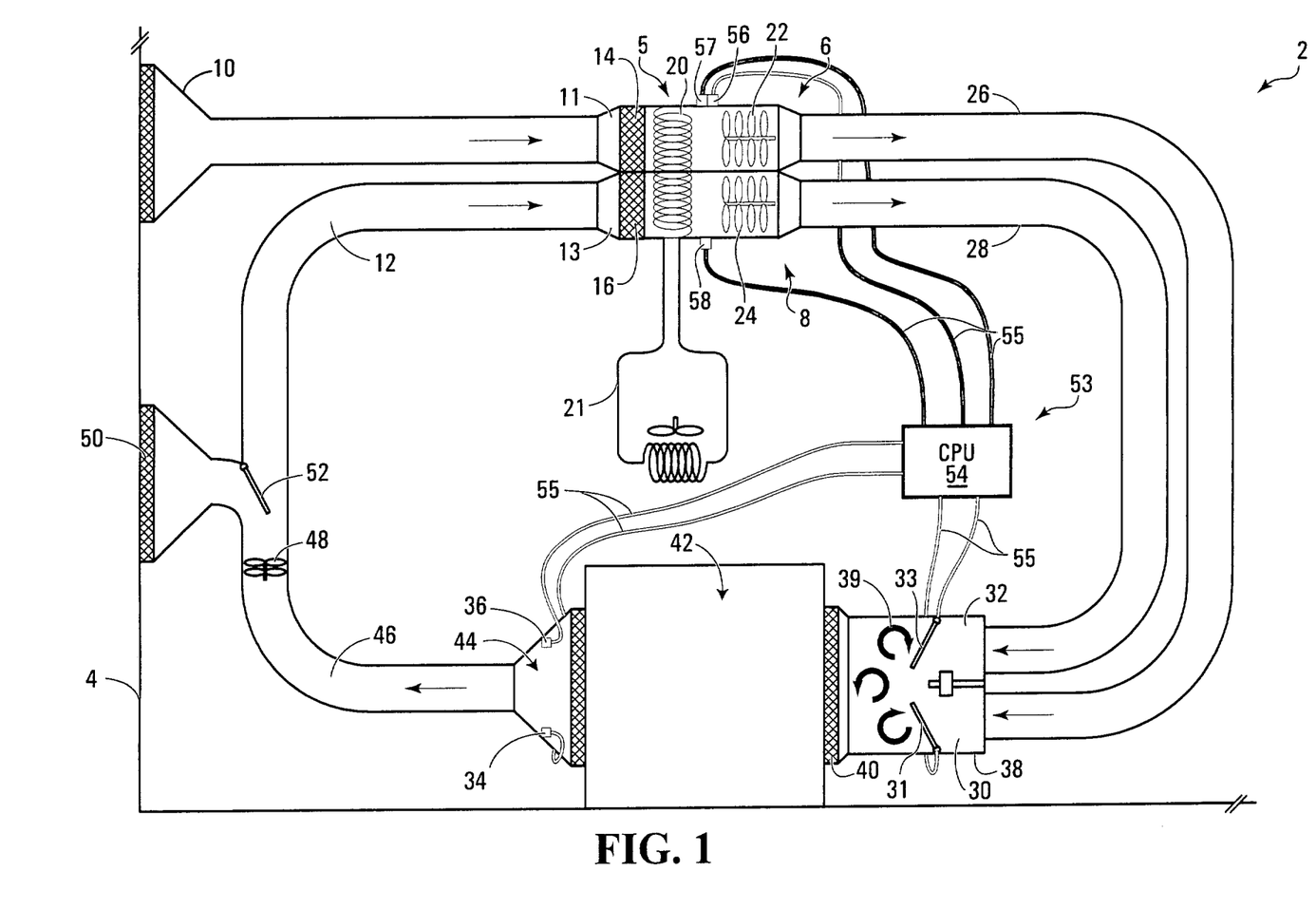
FIG. 1 is a schematic depicting an energy-efficient single-coil twin-fan HVAC system in accordance with the present invention.

Referring to FIG. 1, an HVAC system denoted generally by the reference numeral 2 for ventilating and conditioning the air in a building 4 has an air-handling unit (AHU) 5 which comprises two separate variable-air-volume (VAV) systems 6, 8. The first VAV system 6 draws in fresh air from outside through a fresh air intake 10. The fresh air intake 10 has a diffuser 11 which expands and slows the fresh air for maximal heat transfer. The fresh air is first filtered through a fresh air filter 14 and then cooled and dehumidified by a coil 20. The coil 20 is a heat-exchanging coil with a single feed of chilled water. A fresh air fan 22 moves the conditioned fresh air downstream through a fresh air duct 26 to a fresh air VAV box 30. The fresh air VAV box 30 is connected to a mixing box 38 into which the fresh air may flow. A fresh air damper 31 regulates the flow of conditioned fresh air into a mixing chamber 39 which is a portion of the mixing box 38.

The second VAV system 8 draws recycled air from inside the building through a recycled air intake 12. The recycled air intake 12 has a diffuser 13 to expand and slow the recycled air for maximal heat transfer. The recycled air is first filtered through a recycled air filter 16 and then cooled and dehumidified by said coil 20. The coil 20 is the same heat-exchanging coil that cools the fresh air, even though the fresh air and recycled air travel in separate ducts. A recycled air fan 24 moves the conditioned recycled air downstream through a recycled air duct 28 to a recycled air VAV box 32. The recycled air VAV box 32 is connected to the mixing box 38 into which the recycled air may flow. A recycled air damper 33 regulates the flow of conditioned recycled air into the mixing chamber 39 of the mixing box 38.

A feedback control system, which is managed by a central processing unit (CPU) 54, controls the operation of the HVAC system 2. The CPU 54 computes optimal fan speeds and damper openings based on temperature and carbon dioxide ($CO_2$) readings from sensors located at various places in the building 4.

Referring to FIG. 1, a $CO_2$ sensor 34 is provided for measuring the carbon dioxide concentration in the air. The $CO_2$ sensor is located in a return air duct 46 near a return vent 44. The return air duct 46 also contains a temperature sensor 36 for measuring the air temperature leaving the room. The carbon dioxide sensor 34 and the temperature sensor 36 are linked via wires 55 (or cables) to the central processing unit (CPU) 54 of the control system. The CPU 54 computes the optimal damper openings for the fresh air damper 31 and the recycled air damper 33 so that the optimal mixture of fresh and recycled air flows into a mixing chamber 39 in the mixing box 38. The CPU 54 also regulates the fan velocity of each VAV system to vary the overall cooling and ventilation in accordance with total building demand. The CPU 54 controls the first VAV system 6 and the second VAV system 8.

The AHU 5 comprises a fresh air temperature sensor 56 located between the coil 20 and the fresh air fan 22, that measures the "off-coil" temperature of the fresh air stream. The AHU 5 also comprises a recycled air temperature sensor 58 located between the coil 20 and the recycled air fan 24, that measures the "off-coil" temperature of the recycled air stream. A fresh air humidity sensor 57 is also located in the AHU 5 between the coil 20 and the fresh air fan 22. There are mainly two control modes for the system. In normal operating conditions (i.e. when humidity is within acceptable limits), the CPU 54 uses the temperature signal from the recycled air temperature sensor to control the coolant circuit 21. When the humidity level of the fresh air downstream of the coil exceeds the acceptable limit, the CPU 54 uses the temperature signal from the fresh air temperature sensor to control the flow rate of the coolant in the coolant circuit 21. As long as the humidity downstream of the heat exchanger 20 is within acceptable set-point limits, the temperature of the recycled air downstream of the heat exchanger 20 will predominate in the control.

Referring still to FIG. 1, conditioned fresh air and conditioned recycled air are mixed in the mixing box 38 in accordance with the local cooling and ventilation requirements. The mixing box 38 preferably functions as a plenum chamber. A plenum chamber is an enclosed space in which the air pressure is greater than that in the outside atmosphere. Air is thus forced into the mixing box 38 (plenum chamber) for slow distribution through a localized diffuser vent 40.

As noted above, the mixed air is vented through a diffuser vent 40 into a room 42 (or office or building zone). The room 42 also has the return vent 44, which draws room air into the return air duct 46. A return fan 48 is provided to assist the return flow of the recycled air back to the second VAV system 8. The return air duct 46 bifurcates into an exhaust vent 50 and the recycled air intake 12. A controllable damper 52 is located at the bifurcation of the return air duct 46. The damper 52 can be controlled to divert a variable amount of recycled air back to the second VAV system 8, i.e., into the recycled air intake 12. The CPU 54 controls the damper 52 to alleviate air pressure build-up when large volumes of fresh air are ventilated into the system.

Figure 2:
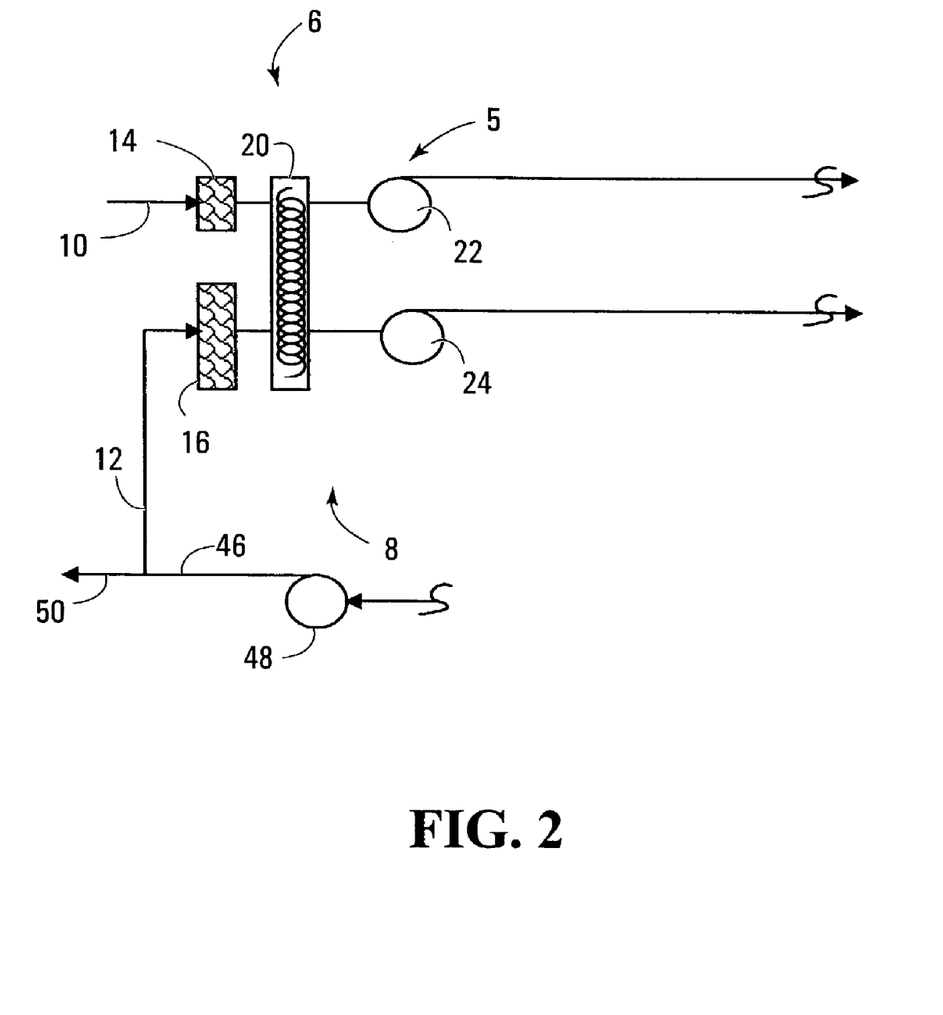
FIG. 2 is a simplified schematic of the system depicted in FIG. 1.
Figure 3:
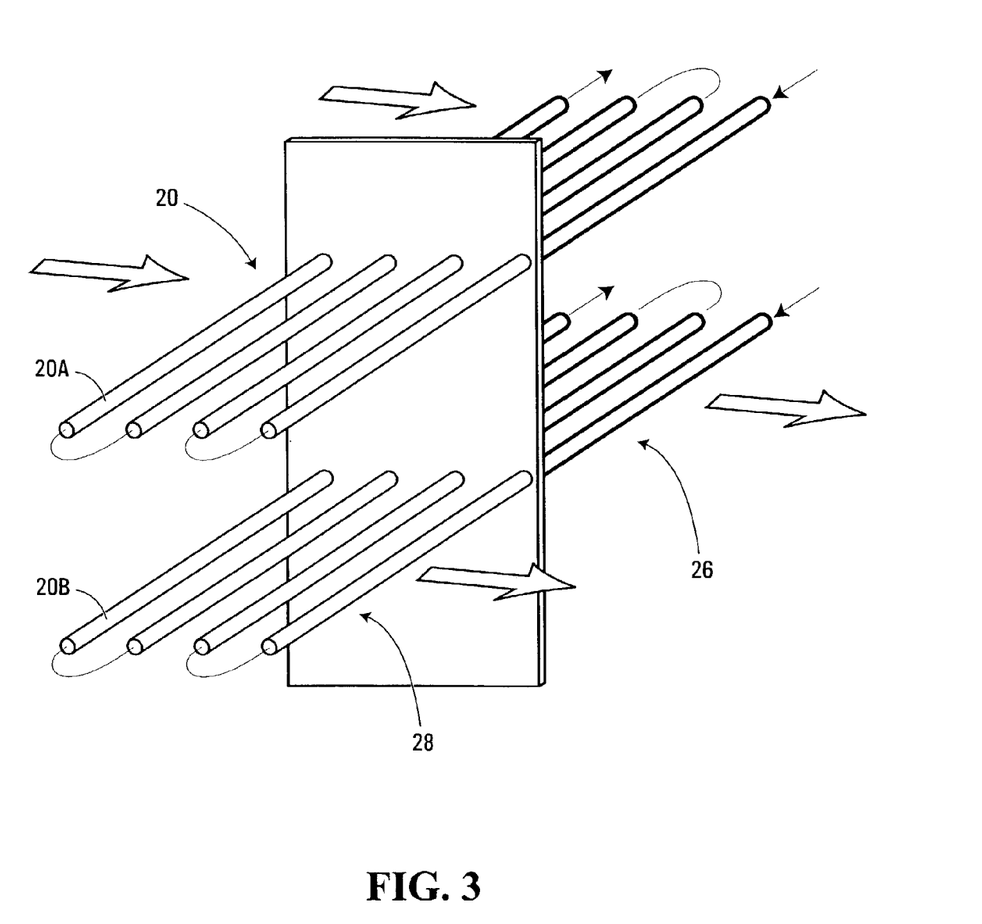
FIG. 3 is an isometric view of the heat-exchanging coil of the system depicted in FIG. 1.

As depicted by the simplified schematic in FIG. 2, the HVAC system 2 has two variable-air-volume (VAV) systems which share the single, common coil 20 for cooling and dehumidifying both the fresh air stream and the recycled air stream. In other words, the fresh air is filtered, conditioned and moved downstream by the first VAV system 6 whereas the recycled air is filtered, conditioned and moved downstream by the second VAV system 8. However, the first and second VAV systems 6, 8 share the same cooling and dehumidifying coil 20. Each pass of chilled water through the tubes of the coil serves both the fresh air stream and the return air stream. The circuiting of the tubes is done in such a way so as to ensure as much of a counter-flow arrangement as possible, which is illustrated in FIG. 3. Also shown in FIG. 3 are two coil sub-circuits 20a and 20b. It is important to note that these form part of the single, integrated coil 20. They are arranged into sub-circuits 20a, 20b in order to optimize counter-flow heat transfer. A thermally insulated sheet metal barrier (a "common wall") 27 separates the fresh air stream from the recycled air stream. The barrier, or common wall, 27 should be suitably modified to interface with one of the plate fins of the heat exchanger to ensure that the air streams remain independent and unmixed as they flow through the heat exchanger 20.

Alternative circuiting arrangements are, of course, possible. FIG. 3 is a schematic diagram of what takes place in the single coil of the system. It illustrates a full-circuiting arrangement (with four passes, for example). A half-circuiting or one-third-circuiting arrangement could also be used. In all of the circuiting arrangements, there is but one, single coil 20 for cooling and dehumidifying both the fresh air and the recycled air. The optimal dehumidifying performance of the single-coil is achieved by the fact that there exists a high driving potential for dehumidification between the high humid conditions of the fresh air in the tropics and the cold surface of the coil. The leaving condition of the fresh after passing through the coil will be typically fully saturated.

Figure 4:
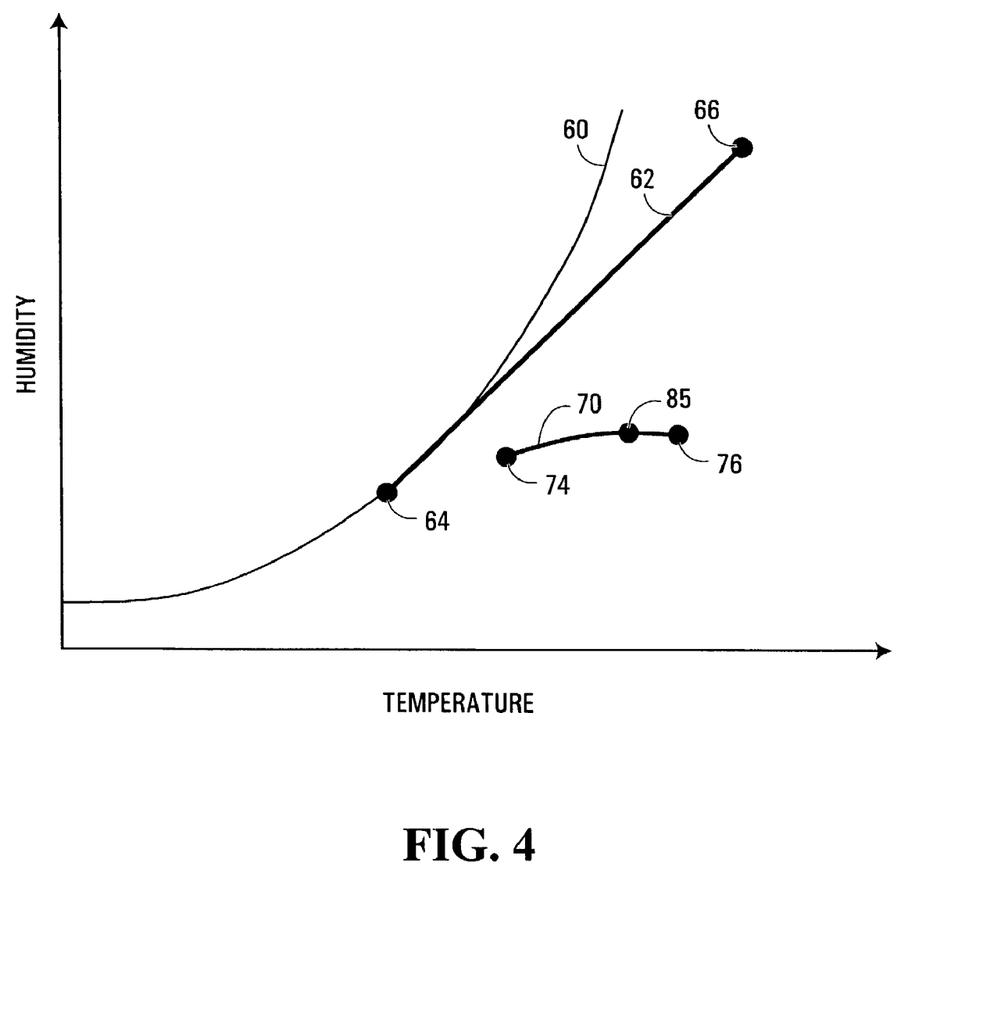
FIG. 4 is a psychrometric chart showing graphically the superior dehumidifying performance of the system depicted in FIG. 1.

FIG. 4 illustrates the psychrometric performance of the single-coil twin-fan HVAC system 2. (A psychrometric chart shows the humidity of air as a function of temperature.) In order to ensure proper cooling and ventilation, the psychometric performance of the coil is controlled based on readings from the "off-coil" temperature of each air stream. The two "off-coil" temperatures play a crucial role in controlling the dynamic psychrometric performance of the coil to ensure acceptable thermal comfort and indoor air quality (IAQ) in the occupied zones. The chart shown in FIG. 4 illustrates the overall dehumidifying performance of the HVAC system 2. Outside air is represented on the graph as condition curve 60. The first VAV system (the fresh air stream) has a condition curve 62 having an off-coil temperature and humidity plotted at point 64 and on-coil conditions plotted at point 66. The second VAV system (the recycled air stream) has a condition curve 70 having an off-coil temperature and humidity plotted at point 74 and on-coil conditions plotted at point 76. The conditions in the room are plotted at point 85.

By de-coupling the ventilation and cooling functions, excellent energy-efficiency may be achieved. A change in the ventilation requirement will only modulate the fresh air fan 22 and will not change the coolant flow rate under normal operating characteristics, i.e., no unusual increase in humidity differences downstream of the first VAV system 6 of the heat exchanger 20. A change in zonal thermal loads, characterized by a modulation of the recycled air fan 24, will modulate the coolant flow rate in the coolant circuit 21. For instance, when the occupancy of the room 42 diminishes, the ventilation requirement also diminishes. The fresh air fan speed is modulated accordingly, but the flow rate in the coolant circuit 21 remains unchanged. The temperature in the room 42 will therefore decrease because the air being cooled is mainly recycled air. The temperature sensor 36 in the return air duct 46 detects this temperature change and modulates the dampers and fan speed accordingly. When temperature and humidity levels begin to rise above the acceptable limits, the CPU 54 uses the signal from the fresh air temperature sensor in order to control the flow rate in the coolant circuit 21.

Although variable-air-volume systems are preferred because they further reduce energy consumption, the single-coil twin-fan system may also use twin constant-air-volume (CAV) systems or a hybrid system comprising a VAV system and a CAV system. If the hybrid system were to be properly implemented, the best mode of operation would be to use a CAV system to drive the air stream whose load characteristics are fairly constant and a VAV system to drive the air stream who load characteristics follow a fluctuating pattern. This provides for maximum flexibility in design and also maximizes energy-saving potential during operation.

The superior performance of the HVAC system of the present invention was validated by various experiments that were conducted in the Indoor Air Quality (IAQ) Chamber of the Department of Building at the National University of Singapore. The seven experiments presented in Table 1 below represent different points of operation of a variable-air-volume fan in a steady-state condition.

TABLE 1

Simulated experimental conditions in two chambers (Room 1 and Room 2) and simulated fan operating characteristics

| Experiment | Steady state period | Fresh air (F/A) fan | Recycled air (R/A) fan | Thermal load Room 1 | Thermal load Room 2 | Ventilation load Room 1 | Ventilation load Room 2 |
|---|---|---|---|---|---|---|---|
| 1 | 11:40 am–12:15 p.m. | 30% | 30% | Base | Base | Base | Base |
| 2a | 12:15–12:35 p.m. | 30% | 30% | Base | Base | High | Base |
| 2b | 1:00–1:20 p.m. | 100% | 30% | Base | Base | High | Base |
| 3a | 2:00–2:15 p.m. | 30% | 30% | High | Base | Base | Base |
| 3b | 2:20–2:45 p.m. | 30% | 100% | High | Base | Base | Base |
| 4a | 3:15–3:40 p.m. | 30% | 30% | Base | Base | High | Base |
| 4b | 3:40–4:10 p.m. | 100% | 30% | Base | Base | High | Base |

Tabulated above in Table 1 are various experiments that were run with thermal and ventilation loads that are characterized as either base or high. Base loads correspond to vacant or nearly vacant conditions, for which only minimal cooling and ventilation are required. Typically, base loads require fans to be run at 30% of their maximum speed. High ventilation loads are simulated by having eight occupants in Room 1 and high thermal loads are simulated by additional heat-emitting lights in Room 1. For the purposes of the performance validation tests, a single-coil twin-fan system was designed and fabricated having the characteristics and geometry presented in Table 2 below.

TABLE 2

Coil configuration and physical geometry

| Coil Characteristic | Fresh air compartment | Recycled air compartment |
|---|---|---|
| Height (mm) | 330 | 330 |
| Width (mm) | 305 | 305 |
| Face area (m²) | 0.1 | 0.1 |
| Face velocity at 100% flow (m/s) | 1.30 | 1.52 |

TABLE 2-continued

Coil configuration and physical geometry

| Coil Characteristic | Fresh air compartment | Recycled air compartment |
|---|---|---|
| Fin density (fpi) | 10 | 10 |
| Number of rows | 6 | 6 |

Even though the single-coil twin-fan system uses a single coil, the heat transfer characteristics of the portion of the coil in the fresh air stream need not be identical to the heat transfer characteristics of the portion of the coil in the recycled air stream. For example, the portion of the coil in the fresh air stream may have a different effective total surface area than the portion of the coil in the recycled air stream. Alternatively, the portion of the coil in the fresh air stream could have a smaller fin density than the portion of the coil in the recycled air stream. (A smaller fin density is better for dehumidification whereas a larger fin density is better for sensible cooling.) The difference in the effective surface areas of the two portions of the single coil is a design criterion that should govern the overall dimensions of the single coil in relation to the total anticipated cooling capacity. It is thus possible to design such coils in modular sizes that are capable of addressing the varying combinations of sensible and latent cooling requirements that are typical of different climatic conditions as well as varying occupancy levels.

The psychrometric analysis of all the seven experiments performed is presented in Table 3 below.

TABLE 3

Psychrometric analyis

| | Psychrometric Parameters | Exp 1 | Exp 2a | Exp 2b | Exp 3a | Exp 3b | Exp 4a | Exp 4b |
|---|---|---|---|---|---|---|---|---|
| Fresh Air (F/A) | F/A ON coil: DBT (° C.) | 28.5 | 27.5 | 27 | 28.2 | 28 | 28.3 | 28.4 |
| | F/A ON coil: DPT (° C.) | 23.6 | 23.6 | 23.4 | 23.5 | 22.4 | 23 | 23.3 |
| | F/A OFF coil: DBT (° C.) | 11.1 | 11.3 | 12 | 11.3 | 12.6 | 11.2 | 12 |
| | F/A OFF coil: DPT (° C.) | 11.1 | 11.3 | 12 | 11.3 | 12.6 | 11.2 | 12 |
| | F/A Enthalpy difference (kJ/kg) | 43.6 | 42.1 | 39.3 | 42.7 | 36.5 | 41.8 | 40.6 |
| | F/A Air flow rate (lps) | 53.9 | 53.9 | 129.7 | 48.3 | 48.3 | 53.6 | 148.3 |
| | F/A Capacity (kW) | 2.78 | 2.69 | 6.04 | 2.44 | 2.09 | 2.65 | 7.13 |

TABLE 3-continued

Psychrometric analyis

| | Psychrometric Parameters | Exp 1 | Exp 2a | Exp 2b | Exp 3a | Exp 3b | Exp 4a | Exp 4b |
|---|---|---|---|---|---|---|---|---|
| Recycled Air (R/A) | R/A ON coil: DBT (° C.) | 24.3 | 24.4 | 23.8 | 24 | 24 | 24.3 | 24.1 |
| | R/A ON coil: DPT (° C.) | 17.4 | 17.8 | 17.2 | 17.3 | 18.2 | 17.5 | 17.2 |
| | R/A OFF coil: DBT (° C.) | 10.6 | 11.3 | 10.3 | 10.9 | 12.5 | 10.7 | 11.7 |
| | R/A OFF coil: DPT (° C.) | 10.6 | 11.3 | 10.3 | 10.9 | 12.5 | 10.7 | 11.7 |
| | R/A Enthalpy difference (kJ/kg) | 25.2 | 24.7 | 25.3 | 24.6 | 22.4 | 25.4 | 22.5 |
| | R/A Air flow rate (lps) | 75.8 | 75.8 | 77.2 | 74.4 | 152.2 | 65.8 | 53.1 |
| | R/A Capacity (kW) | 2.26 | 2.22 | 2.31 | 2.17 | 4.04 | 1.98 | 1.41 |
| F/A + R/A capacity | Total capacity of single coil with twin fans (kW) | 5.04 | 4.91 | 8.35 | 4.61 | 6.13 | 4.63 | 8.54 |

Table 3 shows that the single-coil system is dynamically responsive to the varying thermal and ventilation loads. Experiments 2b and 4b show the steady-state operating conditions of the coil when high ventilation is required in Room 1. The on-coil conditions in the recycled air stream (designated "R/A ON coil" in Table 3) are representative of the environmental conditions in the two rooms. Room 1, which requires high ventilation, has a relative humidity of 67% and 65% in Experiment 2b and Experiment 4b, respectively. The "off-coil" temperature of the recycled air is used in Experiment 2b and that of the fresh air is used in Experiment 4b. It is logical to use the fresh air "off-coil" temperature to control the chilled water flow rate through the coil in situations of high ventilation loads, as would be typical in the tropics.

A comparison of Experiment 3a and Experiment 3b shows that high thermal loads in Room 1 can be addressed with a high-volume air stream of recycled air which results in room humidity levels around 70% relative humidity. The occupancy in Room 1 and Room 2 is at the base level. The humidity level in Experiment 3b is achieved through chilled water modulation based on the recycled air "off-coil" temperature. The humidity can also be controlled based on the fresh air "off-coil" temperature. Based on these experimental results, the following control strategy is proposed. Chilled water modulation should be achieved by fresh air stream "off-coil" temperature feedback in climatic conditions requiring high ventilation. In contrast, chilled water modulation should be achieved by recycled air stream "off-coil" temperature feedback in climatic conditions with high thermal loads. It is also possible to switch from one control strategy to another, with ventilation predominating. As the chilled water modulation is achieved by either of the two "off-coil" temperatures, the chilled water flow rate through the compartment of the coil whose "off-coil" temperature is not in use could be used to alter the psychrometric performance of the system. For example, if the recycled air stream's "off-coil" temperature is used to control the chilled water flow rate, the air conditions of the fresh air stream could be dynamically varied. However, it is the mixture of the fresh air and the recycled air in the mixing box that determines the space conditions. An inherent buffer is built into the design of this coil. In these experiments, a buffer of 2° C. (between 10° C. and 12° C.) on the saturation line is observed for the supply air temperatures.

Table 3 shows the energy-efficiency of the single-coil twin-fan system (SCTF). Energy is conserved because the fresh air fan and the recycled air fan are controlled independently to optimize their respective airflow requirements based on the individual, localized demand for ventilation or cooling. The coil is thus not required to provide more cooling than is necessary as operating conditions change. For example, in Experiment 4b, the total amount of fresh and recycled air used is 725 cubic meters per hour ($m^3/h$). The fresh air fan operated at 100% of its maximum speed whereas the recycled air fan only operated at 30% of its maximum speed. If similar room conditions were to be achieved using a prior art VAV system, the fan would have to operate at 65% of its maximum speed to provide the same amount of total airflow to the room. In other words, Experiment 4b could be seen as a 65% part-load condition. This would translate to an airflow rate of 1115 $m^3/h$ when the conventional VAV fan operates at 100% speed. By simple proportionality, the fresh air to be provided at 100% fan speed ought to be about 820 $m^3/h$ if the amount of fresh air at the part-load condition of 65% is to be equal to what is being provided by the SCTF system (534 $m^3/h$). This implies that at 100% output, the additional energy consumed by a conventional, prior art coil in a conventional VAV system is equivalent to the additional amount of fresh air provided at 100% output, which in this case is about 53%. By contrast, in the case of an SCTF system, the total amount of airflow at 100% output is 1115 $m^3/h$. This breaks down into a fresh airflow rate of 534 $m^3/h$ and a recycled airflow rate of 581 $m^3/h$.

Based on the foregoing psychrometric analysis, the SCTF system of the present invention is estimated to be approximately 15% more energy efficient than prior art VAV systems that are currently in use. This estimate, however, does not even include the energy savings attendant in reduced fan use. Moreover, the SCTF system does not need to have a second water pump or a second chilled water loop. This also results in further energy savings.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. A ventilation and air-conditioning system for energy-efficient conditioning of independent fresh and recycled air streams, said system comprising:
   (a) a first intake for drawing in a volume of fresh air;
   (b) a second intake for drawing in a volume of recycled air;
   (c) a single-coil heat exchanger for conditioning the volume of fresh air in a first region and the volume of recycled air in a second region, thereby producing a supply of conditioned fresh air and a supply of conditioned recycled air, wherein said first region and said second region are separated by a barrier and wherein said single-coil heat exchanger defines a fluid path transporting heat exchange fluid from said first region to said second region through said barrier, and transporting said heat exchange fluid back through said barrier from said second region to said first region;
   (d) a first fan for moving said supply of conditioned fresh air downstream in a first duct;
   (e) a second fan for moving said supply of conditioned recycled air downstream in a second duct;
   (f) a mixing box connected downstream of said first duct and said second duct, said mixing box being an enclosure in which said supply of conditioned fresh air and said supply of conditioned recycled air may mix prior to being ventilated into a room or zone; and
   (g) a control system for sensing a zonal temperature and a zonal ventilation requirement and for regulating said supply of conditioned fresh air in accordance with said zonal ventilation requirement and for regulating said supply of conditioned recycled air in accordance with said zonal temperature.

2. A ventilation and air-conditioning system as defined in claim 1 wherein said mixing box comprises a fresh air compartment connected to said first duct and a recycled air compartment connected to said second duct, said fresh air compartment comprising a fresh air damper for admitting conditioned fresh air into a mixing chamber within said mixing box, and said recycled air duct comprising a recycled air damper for admitting conditioned recycled air into the mixing chamber within said mixing box.

3. A ventilation and air-conditioning system as defined in claim 2 further comprising a return air duct connected to said second intake, said return air duct comprising a carbon dioxide sensor for sensing said zonal ventilation requirement and a temperature sensor for sensing said zonal temperature, said sensors providing signals to said control system.

4. A ventilation and air-conditioning system as defined in claim 3 wherein said single-coil heat exchanger has coolant flowing in a counter-flow arrangement.

5. A ventilation and air-conditioning system as defined in claim 4 further comprising a fresh air filter connected to said first intake and a recycled air filter connected to said second intake.

6. A ventilation and air-conditioning system as defined in claim 1 wherein said first fan is a variable-air-volume fan and said second fan is a variable-air-volume fan.

7. A ventilation and air-conditioning system as defined in claim 1 wherein said first fan is a constant-air-volume fan and said second fan is a constant-air-volume fan.

8. A ventilation and air-conditioning system as defined in claim 1 wherein said first fan is a constant-air-volume fan and said second fan is a variable-air-volume fan.

9. A ventilation and air-conditioning system as defined in claim 5 wherein said first fan is a variable-air-volume fan and said second fan is a variable-air-volume fan.

10. A ventilation and air-conditioning system as defined in claim 9 wherein said control system comprises a central processing unit for processing signals received from said temperature sensor and said carbon dioxide sensor whereby the central processing unit controls said first fan and said second fan.

11. A ventilation and air-conditioning system as defined in claim 10 wherein said central processing unit further controls the rate of coolant flow in said single-coil heat exchanger.

12. A ventilation and air-conditioning system as defined in claim 11 wherein said central processing unit further controls an exhaust damper for exhausting an excess volume of recycled air.

13. An air-handling unit for use in a heating, ventilation and air-conditioning system, said air-handling unit comprising: a first conditioning system for conditioning and moving a volume of fresh air through a first duct; a second conditioning system for conditioning and moving a volume of recycled air through a second duct; a barrier at least partially separating said first conditioning system and said second conditioning system; a heat-exchanging coil passing through said barrier at least twice to pass heat exchange fluid from said first conditioning system to said second conditioning system, and back from said second conditioning system to said first conditioning system to condition both said volume of fresh air and said volume of recycled air.

14. An air-handling unit as defined in claim 13 wherein said first conditioning system is a first variable-air-volume system and said second conditioning system is a second variable-air-volume system.

15. An air-handling unit as defined in claim 14 wherein said first variable-air-volume system comprises a first fan controllable by a control system based on a feedback signal from a carbon dioxide sensor and said second variable-air-volume system comprises a second fan controllable by said control system based on a feedback signal from a temperature sensor.

16. An air-handling unit as defined in claim 15 wherein said first variable-air-volume system further comprises a fresh air filter and said second variable-air-volume system further comprises a recycled air filter.

17. An air-handling unit as defined in claim 16 wherein said coil is disposed in a counter-flow arrangement.

18. An air-handling unit as defined in claim 17 wherein said coil contains a coolant whose rate of flow is regulated by said control system based on the feedback signal from a temperature sensor located in the air-handling unit.

19. An air-handling unit as defined in claim 13 wherein said first conditioning system is a first constant-air-volume system and said second conditioning system is a second constant-air-volume system.

20. An air-handling unit as defined in claim 13 wherein said first conditioning system is a constant-air-volume system and said second conditioning system is a variable-air-volume system.

21. An air-handling unit as defined in claim 13, wherein said barrier is thermally insulated metal barrier.

22. A ventilation and air-conditioning system as defined in claim 1, wherein said barrier is thermally insulated metal barrier.

* * * * *